(12) United States Patent
Xie et al.

(10) Patent No.: US 11,489,438 B2
(45) Date of Patent: Nov. 1, 2022

(54) INRUSH CURRENT LIMITING AND SURGE PROTECTION CIRCUIT AND SYSTEM

(71) Applicant: Artesyn Embedded Technologies, Inc., Kowloon (HK)

(72) Inventors: Yongtao Xie, Shenzhen (CN); Pengfei Cai, Shenzhen (CN); Wenchao Que, Shenzhen (CN)

(73) Assignee: Astec International Limited, Kowloon (HK)

( * ) Notice: Subject to any disclaimer, the term of this patent is extended or adjusted under 35 U.S.C. 154(b) by 78 days.

(21) Appl. No.: 17/076,045

(22) Filed: Oct. 21, 2020

(65) Prior Publication Data

US 2022/0123648 A1 Apr. 21, 2022

(51) Int. Cl.
*H02M 1/32* (2007.01)
*H02M 1/00* (2006.01)

(52) U.S. Cl.
CPC ............ *H02M 1/32* (2013.01); *H02M 1/0009* (2021.05); *H02M 1/0038* (2021.05)

(58) Field of Classification Search
CPC .......... H02M 1/32; H02M 1/322; H02M 1/34; H02M 1/0009; H02M 1/0038
See application file for complete search history.

(56) References Cited

U.S. PATENT DOCUMENTS

| | | | | |
|---|---|---|---|---|
| 4,586,104 A * | 4/1986 | Standler | ................... | H02H 9/06 361/119 |
| 5,715,154 A | 2/1998 | Rault | | |
| 6,493,245 B1 | 12/2002 | Phadke | | |
| 6,714,429 B2 | 3/2004 | Phadke | | |
| 9,190,829 B2 * | 11/2015 | Miller | ...................... | H02H 9/06 |
| 2005/0280972 A1 | 12/2005 | Jonsson | | |
| 2006/0274468 A1 * | 12/2006 | Phadke | .................. | H02H 9/001 361/93.1 |
| 2011/0006748 A1 * | 1/2011 | Jang | .................... | H02M 1/4225 323/299 |
| 2017/0302165 A1 * | 10/2017 | Marcinkiewicz | ... | H02M 1/4216 |
| 2019/0259530 A1 * | 8/2019 | Aloszko | ..................... | G05F 1/20 |

FOREIGN PATENT DOCUMENTS

| CN | 1725592 A | 1/2006 |
|---|---|---|
| CN | 101268597 A | 9/2008 |
| CN | 109861518 A | 6/2019 |

OTHER PUBLICATIONS

International Search Report and Written Opinion for PCT Application No. PCT/CN2020/0122155, filed Oct. 20, 2020; dated Jul. 21, 2021.
Combining GDTs and MOVs for Surge Protection of AC Power Lines; Littelfuse, Inc.; EC640; Jan. 2002.

* cited by examiner

*Primary Examiner* — Adolf D Berhane

(57) ABSTRACT

A power conversion device is provided. The power conversion device includes a bulk capacitor, a current limiting resistor in series with the bulk capacitor, and an inrush current control device configured to bypass the current limiting resistor when activated. The power conversion device also includes a bypass device in parallel with the current limiting resistor, configured to provide a low-resistance path to the bulk capacitor during a power surge.

20 Claims, 8 Drawing Sheets

INRUSH CURRENT LIMITING AND SURGE PROTECTION CIRCUIT AND SYSTEM

TECHNICAL FIELD

Aspects of the disclosure are related to electronic components and in particular to surge protection and inrush current limiting for electronic components.

TECHNICAL BACKGROUND

Power converters are commonly used in a variety of systems including telecom systems, fast chargers for electric vehicles, and other applications requiring high power density and high efficiency.

Common power converter designs include a variety of protection devices designed to limit voltage spikes and current surges occurring at their input ports. Often a metal oxide varistor is placed between the input ports to reduce voltage spikes occurring at the inputs. However, this alone is not sufficient to protect power switching transistors within the converter from lightning induced surges, particularly when input power to the converter is disabled.

OVERVIEW

In an embodiment, a power conversion device is provided. The power conversion device includes a bulk capacitor, a current limiting resistor in series with the bulk capacitor, and an inrush current control device configured to bypass the current limiting resistor when activated.

The power conversion device also includes a bypass device in parallel with the current limiting resistor, configured to provide a low-resistance path to the bulk capacitor during a power surge.

In another embodiment, an inrush current limiting and surge protection circuit is provided. The inrush current limiting and surge protection circuit includes a bulk capacitor, a current limiting resistor in series with the bulk capacitor, and an inrush current control device configured to bypass the current limiting resistor when activated.

The inrush current limiting and surge protection circuit also includes a bypass device in parallel with the current limiting resistor, configured to provide a low-resistance path to the bulk capacitor during a power surge.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

The example embodiments described herein illustrate different methods for limiting inrush current and providing surge protection for power converter devices. These embodiments limit inrush current at power on and provide power surge protection to power conversion devices when they are connected to the AC grid but the AC power is off.

Figure 1:
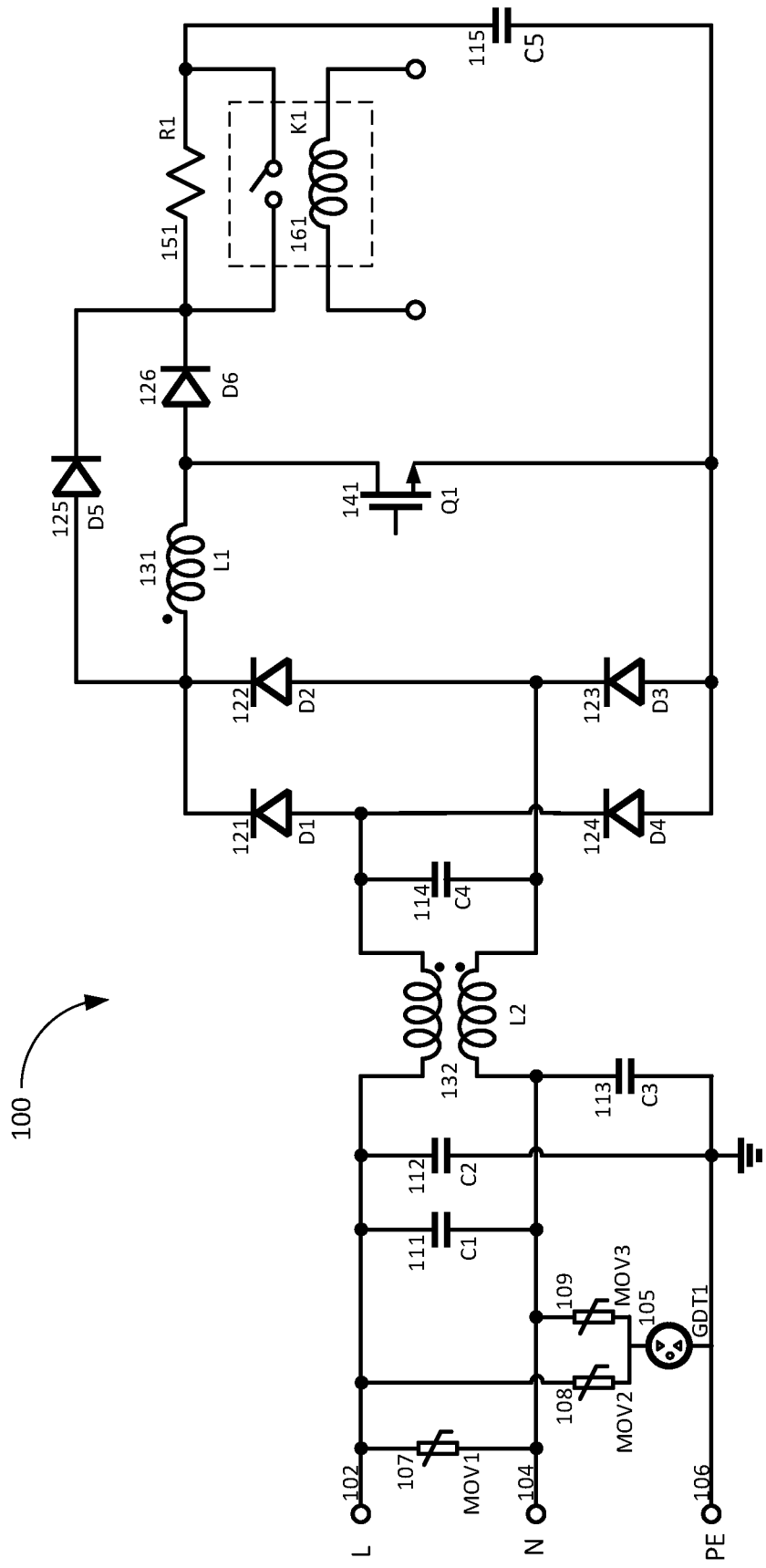
FIG. 1 illustrates an exemplary prior art power converter circuit.

FIG. 1 illustrates an exemplary prior art AC/DC power converter circuit 100 with bridge rectification and active power factor correction. This circuit includes inputs line 102, neutral 104, and protective earth 106. Here the active power factor correction circuit includes inductor L1 131, diode D6 126, and power switching transistor Q1 141. Power switching transistor Q1 141 is susceptible to large voltage spikes and current surges and must be protected to prevent damage.

In this prior art example, inrush current limiting components current limiting resistor R1 151 and relay K1 161 are placed in series with bulk capacitor C5 115. In this example relay K1 161 acts as an inrush current control device. However, other examples may use metal-oxide-semiconductor field-effect transistors (MOSFETs), insulated-gate bipolar transistors (IGBTs), and the like, alone or in combination, as inrush current control devices. Initially the voltage across bulk capacitor C5 115 is zero. When input power is applied to the power conversion device, inrush current charges bulk capacitor C5 115 until the voltage of bulk capacitor C5 115 reaches the peak of the rectified input voltage.

During the positive half cycle, inrush current passes through diode D1 121, diode D5 125, and current limiting resistor R1 151 to charge bulk capacitor C5 115 and returns through diode D3 123. During the negative half cycle, inrush current passes through diode D2 122, diode D5 125, and current limiting resistor R1 151 to charge bulk capacitor C5 115 and returns through diode D4 124.

Current limiting resistor R1 151 limits the inrush current. Once bulk capacitor C5 115 is fully charged, and the internal circuit starts to operate, relay K1 161 is activated to short current limiting resistor R1 151 to reduce power loss.

Other components of this exemplary circuit include metal oxide varistor MOV1 107 connected between the line 102 and neutral 104 inputs to clamp voltage spikes across the inputs. Additionally, metal oxide varistors MOV2 108 and MOV3 109, along with gas discharge tube GDT1 105 are connected across the inputs in a configuration designed to clamp common mode power surges at the input lines. Typically, the metal oxide varistors (MOVs) or voltage dependent resistors (VDRs) used in power conversion devices are selected to comply with the Annex G8.2 requirements of IEC Standard IEC62368-1 or the Annex Q requirements of ITE Standard IEC61050-1, which states that the rated maximum continuous voltage of the MOV/VDR should be at least 125% of the upper rated voltage of the power conversion device.

For example, if the power conversion device is rated for 100-240V AC, the MOV/VDR rating should be at least 300V AC. If the power conversion device is rated for 100-250V AC, the MOV/VDR rating should be at least 312.5V AC. To meet the ITE Standard requirement, the clamping voltage of the appropriate MOV/VDR is greater than 700V as illustrated below in Table 1.

TABLE 1

| Varistor Voltage (@ 1 mA DC) | Maximum Continuous Voltage | | Maximum Clamping Voltage (8/20 μs) | |
|---|---|---|---|---|
| $V_{1\,mA}$ (V) | $V_{AC(rms)}$ (V) | $V_{DC}$ (V) | $V_P$ (V) | $I_P$ (A) |
| 470 (423~517) | 300 | 385 | 775 | 50 |
| 510 (459~561) | 320 | 410 | 845 | 50 |

This exemplary circuit also includes an electromagnetic interference (EMI) filter comprising capacitors C1 111, C2 112, C3 113, and C4 114, along with inductor L2 132. Capacitors C1 111 and C4 114 are X capacitors configured to reduce differential mode noise, while capacitors C2 112 and C3 112 are Y capacitors configured to reduce common mode noise.

If power conversion device 100 is connected to the AC grid, but the AC is off or disabled, then the internal circuit is not able to operate and relay K1 161 remains open. If a lightning surge couples to the AC lines when power conversion device 100 is in that state, the power surge (due to the lightning) is only clamped by the MOVs/VDRs and GDT at the input interface, and power switching transistor Q1 141 is at risk of damage.

In this scenario the clamping voltage is high and the residual power surge energy is not absorbed by bulk capacitor C5 115 since relay K1 161 is open. Power switching transistor Q1 141 is exposed to that residual power surge voltage, resulting in electrical over stress failure of power switching transistor Q1 141.

Figure 2:
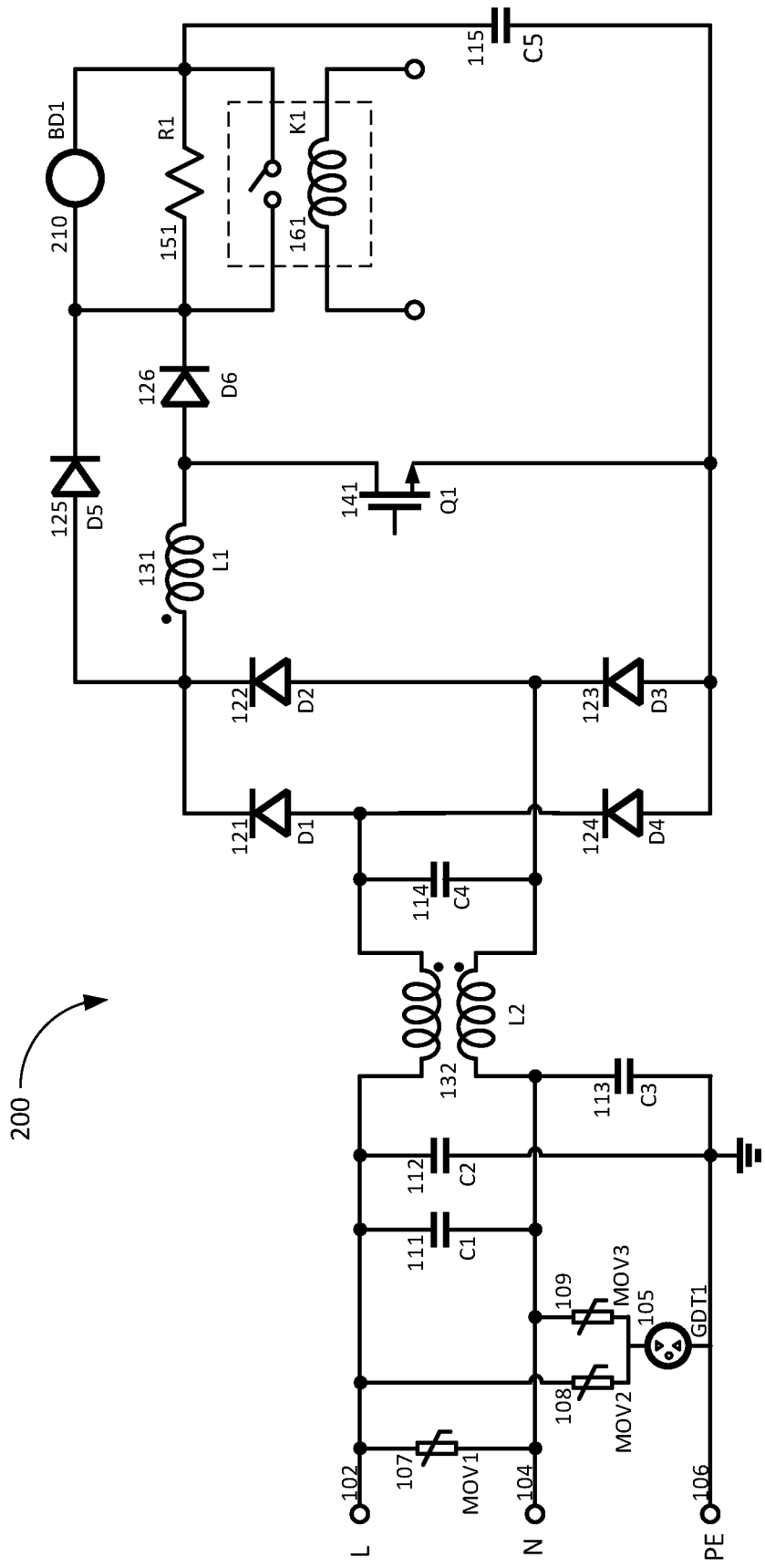
FIG. 2 illustrates an exemplary power converter circuit with a bridge rectifier including inrush current limiting and surge protection.

FIG. 2 illustrates an exemplary power converter circuit 200 with bridge rectification and active power factor correction including inrush current limiting and surge protection. This exemplary power converter circuit 200 is identical to power converter circuit 100 from FIG. 1 with the addition of bypass device BD1 210 which is added in parallel to current limiting resistor R1 151.

During normal power up, power converter circuit 200 operates very similar to power converter circuit 100 from FIG. 1. When input power is applied to the power conversion device, inrush current charges bulk capacitor C5 115 until the voltage of bulk capacitor C5 115 reaches the peak of the rectified input voltage.

During the positive half cycle, inrush current passes through diode D1 121, diode D5 125, and current limiting resistor R1 151 to charge bulk capacitor C5 115 and returns through diode D3 123. During the negative half cycle, inrush current passes through diode D2 122, diode D5 125, and current limiting resistor R1 151 to charge bulk capacitor C5 115 and returns through diode D4 124.

Current limiting resistor R1 151 limits the inrush current. Once bulk capacitor C5 115 is fully charged, and the internal circuit starts to operate, relay K1 161 is activated to short current limiting resistor R1 151 to reduce power loss. In this example relay K1 161 acts as an inrush current control device. However, other examples may use MOSFETs, insulated-gate bipolar transistors (IGBTs), and the like, alone or in combination as inrush current control devices.

If power conversion device 200 is connected to the AC grid, but the AC is off or disabled, then the internal circuit is not able to operate and relay K1 161 remains open. If a lightning surge couples to the AC lines when power conversion device 200 is in that state, the power surge (due to the lightning) is first clamped by the MOVs/VDRs and GDT at the input interface. The residual power surge then activates bypass device BD1 210, which then provides a low-resistance path to bulk capacitor C5 115. The residual power surge energy passes through bypass device BD1 210 and is absorbed by bulk capacitor C5 115 even though relay K1 161 is open. Thus, power switching transistor Q1 141 is protected from the power surge energy.

Examples of bypass device BD1 210 are illustrated in FIGS. 4A-4D and discussed in detail below.

Figure 3:
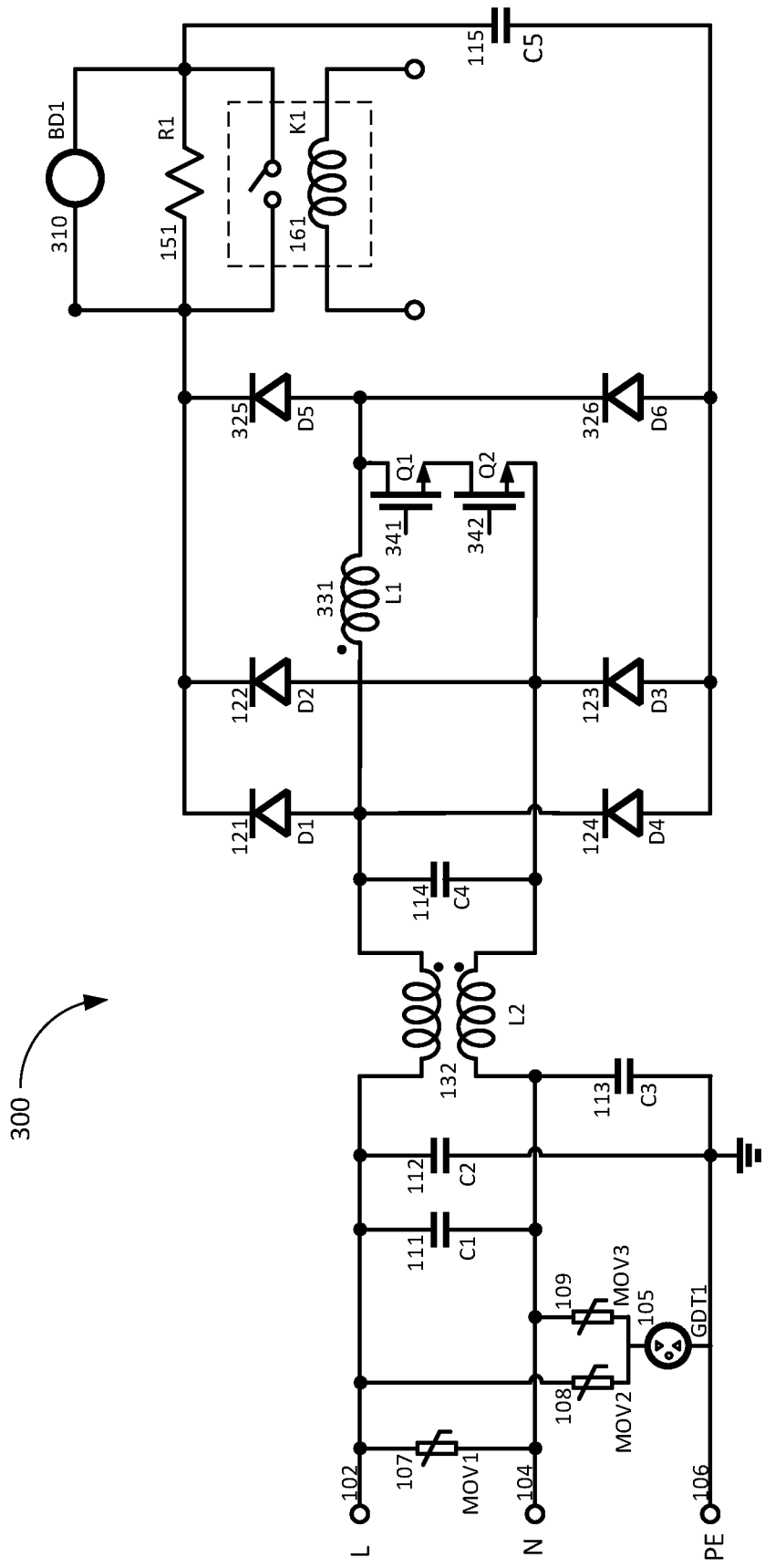
FIG. 3 illustrates an exemplary power converter circuit with bridgeless power factor correction including inrush current limiting and surge protection.

FIG. 3 illustrates an exemplary power converter circuit 300 with bridgeless power factor correction including inrush current limiting and surge protection. This example power converter circuit 300 is similar to power converter circuit 200 from FIG. 2, but in a H-bridge bridgeless power factor correction configuration.

Here, the power factor correction circuit includes power switching transistors Q1 341 and Q2 342, along with inductor L1 331, and diodes D5 325 and D6 326.

During normal power up, power converter circuit 300 operates very similar to power converter circuit 200 from FIG. 2. When input power is applied to the power conversion device, inrush current charges bulk capacitor C5 115 until the voltage of bulk capacitor C5 115 reaches the peak of the rectified input voltage.

During the positive half cycle, inrush current passes through diode D1 121 and current limiting resistor R1 151 to charge bulk capacitor C5 115 and returns through diode D3 123. During the negative half cycle, inrush current passes through diode D2 122 and current limiting resistor R1 151 to charge bulk capacitor C5 115 and returns through diode D4 124.

Current limiting resistor R1 151 limits the inrush current. Once bulk capacitor C5 115 is fully charged, and the internal circuit starts to operate, relay K1 161 is activated to short current limiting resistor R1 151 to reduce power loss. In this example relay K1 161 acts as an inrush current control device. However, other examples may use MOSFETs, insulated-gate bipolar transistors (IGBTs), and the like, alone or in combination as inrush current control devices.

If power conversion device 300 is connected to the AC grid, but the AC is off or disabled, then the internal circuit is not able to operate and relay K1 161 remains open. If a lightning surge couples to the AC lines when power conversion device 300 is in that state, the power surge (due to the lightning) is first clamped by the MOVs/VDRs and GDT at the input interface. The residual lightning surge then activates bypass device BD1 310, which then provides a low-resistance path to bulk capacitor C5 115. The residual lightning surge energy passes through bypass device BD1 310 and is absorbed by bulk capacitor C5 115 even though relay K1 161 is open. Thus, power switching transistors Q1 341 and Q2 134 are protected from the lightning surge energy.

Examples of bypass device BD1 310 are illustrated in FIGS. 4A-4D and discussed in detail below.

While the examples illustrated in FIGS. 2 and 3 show current limiting resistor R1 151, relay K1 161, and bypass devices BD1 210 and 310, adjacent to bulk capacitor C5 115, other embodiments may place these elements on the line input 102 at some location between MOV1 107 and C4 114. However, when placed in this location, relay K1 161 would need to be sized to handle more current than when adjacent to bulk capacitor C5 115, which increases the size and cost of relay K1 161.

Also, while the examples illustrated in FIGS. 2 and 3 show AC/DC power converters, various embodiments of the present invention may also be used in various other circuits including, but not limited to, DC/DC converters, high voltage DC converters, and the like.

FIGS. 4A-4D illustrate exemplary bypass devices to limit inrush current and provide surge protection for power converter devices. In these example embodiments, a portion of a power converter device (such as power converter devices 200 and 300 from FIGS. 2 and 3 respectively) is illustrated. These circuits all include current limiting resistor R1 402, relay K1 404, and bulk capacitor C5 406. In these examples relay K1 404 acts as an inrush current control device. However, other examples may use MOSFETs, insulated-gate bipolar transistors (IGBTs), and the like, alone or in combination, as inrush current control devices.

Figure 4A:
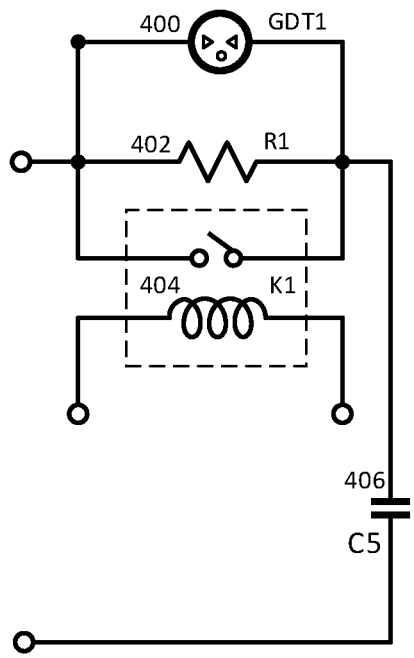
FIGS. 4A-4F illustrate exemplary bypass devices to limit inrush current and provide surge protection for power converter devices.

FIG. 4A illustrates an example circuit where the bypass device is a gas discharge tube GDT1 400. In this example, gas discharge tube GDT1 400 is selected such that its DC breakdown voltage is higher than the maximum rectified input voltage, but lower than the rated voltage of power switching transistor Q1 141 of FIG. 2 or power switching transistors Q1 341 and Q2 342 of FIG. 3.

Figure 4B:
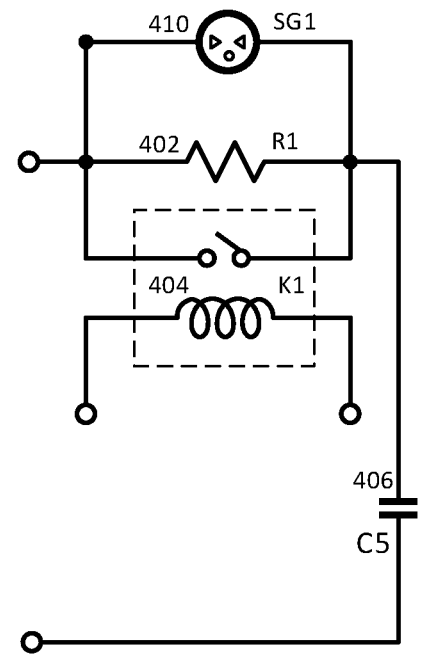
Figure 4C:
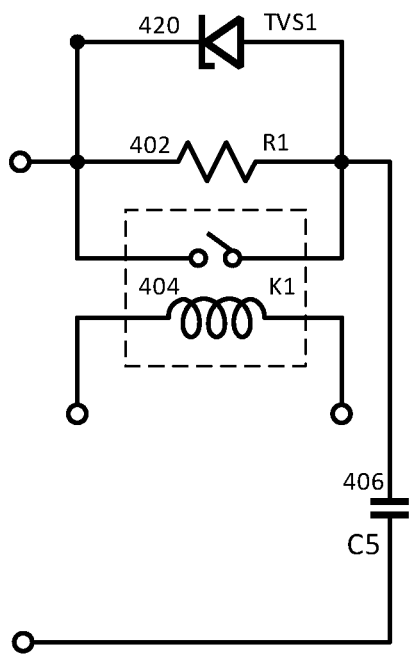
Figure 4D:
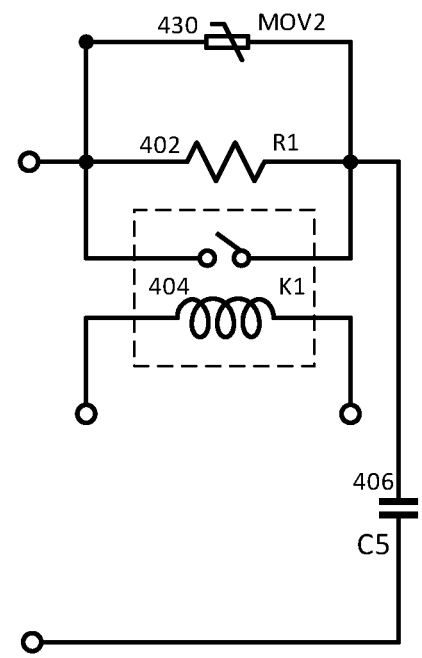
Figure 4E:
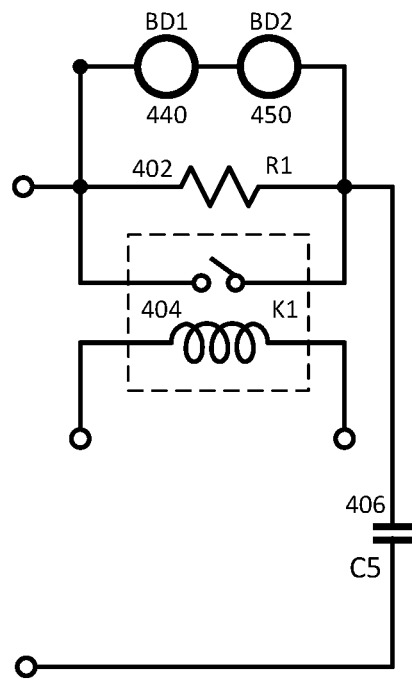
Figure 4F:
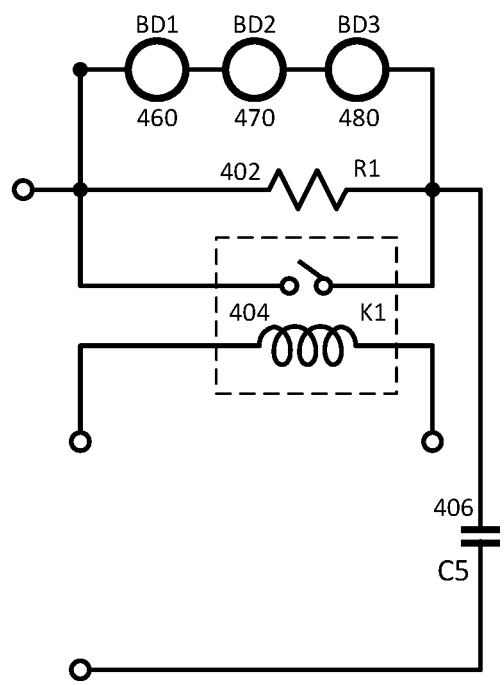

FIG. 4B illustrates an example circuit where the bypass device is a spark gap SG1 410. FIG. 4C illustrates an example circuit where the bypass device is a transient voltage suppressor TVS1 420. FIG. 4D illustrates an example circuit where the bypass device is a MOV/VDR MOV2 430. FIGS. 4E, 4F illustrate example circuits where the bypass device includes multiple bypass devices such as bypass devices 440, 450 (FIG. 4E) or bypass devices 460, 470, and 480 (FIG. 4F). Each bypass device 440, 450, 460, 470, and 480 may be one of the bypass devices shown in FIGS. 4A-4D. While two and three bypass devices are illustrated in FIGS. 4E and 4F, embodiments may include more than three bypass devices. All of these various bypass devices are ideally selected to meet both inrush current limits and lightning surge requirements.

Note that further embodiments of the present invention may use any of these bypass devices, alone or in combination, within specific applications to provide inrush current limiting and lightning surge protection.

Figure 5:
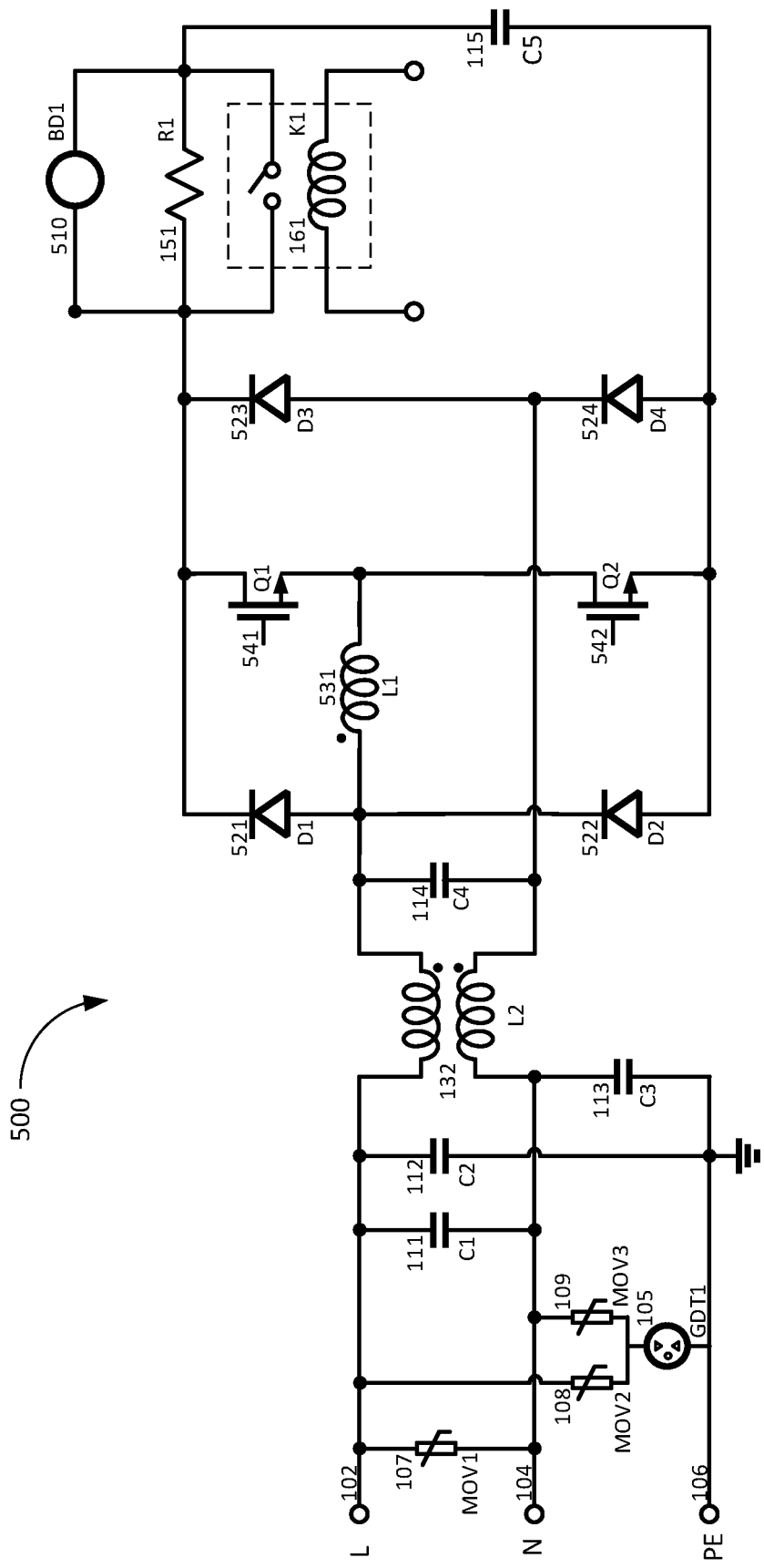
FIG. 5 illustrates an exemplary power converter circuit with bridgeless power factor correction including inrush current limiting and surge protection.

FIG. 5 illustrates an exemplary power converter circuit 500 with bridgeless power factor correction including inrush current limiting and surge protection. This example power converter circuit 500 is similar to power converter circuit 300 from FIG. 3, but in a totem-pole bridgeless power factor correction configuration.

Here, the power factor correction circuit includes power switching transistors Q1 541 and Q2 542, along with inductor L1 531, and diodes D3 523 and D4 524.

During normal power up, power converter circuit 500 operates very similar to power converter circuit 300 from FIG. 3. When input power is applied to the power conversion device, inrush current charges bulk capacitor C5 115 until the voltage of bulk capacitor C5 115 reaches the peak of the rectified input voltage.

During the positive half cycle, inrush current passes through diode D1 121 and current limiting resistor R1 151 to charge bulk capacitor C5 115 and returns through diode D4 524. During the negative half cycle, inrush current passes through diode D3 523 and current limiting resistor R1 151 to charge bulk capacitor C5 115 and returns through diode D2 522.

Current limiting resistor R1 151 limits the inrush current. Once bulk capacitor C5 115 is fully charged, and the internal circuit starts to operate, relay K1 161 is activated to short current limiting resistor R1 151 to reduce power loss. In this example relay K1 161 acts as an inrush current control device. However, other examples may use MOSFETs, insulated-gate bipolar transistors (IGBTs), and the like, alone or in combination as inrush current control devices.

If power conversion device 500 is connected to the AC grid, but the AC is off or disabled, then the internal circuit is not able to operate and relay K1 161 remains open. If a lightning surge couples to the AC lines when power conversion device 500 is in that state, the power surge (due to the lightning) is first clamped by the MOVs/VDRs and GDT at the input interface. The residual power surge then activates bypass device BD1 510, which then provides a low-resistance path to bulk capacitor C5 115. The residual power surge energy passes through bypass device BD1 510 and is absorbed by bulk capacitor C5 115 even though relay K1 161 is open. Thus, power switching transistors Q1 541 and Q2 542 are protected from the power surge energy.

Examples of bypass device BD1 510 are illustrated in FIGS. 4A-4D and discussed in detail above.

While the examples illustrated in FIGS. 2, 3, and 5 show current limiting resistor R1 151, relay K1 161, and bypass devices BD1 210, 310, and 510, adjacent to bulk capacitor C5 115, other embodiments may place these elements on the line input 102 at some location between MOV1 107 and C4 114. However, when placed in this location, relay K1 161 would need to be sized to handle more current than when adjacent to bulk capacitor C5 115, which increases the size and cost of relay K1 161.

Figure 6:
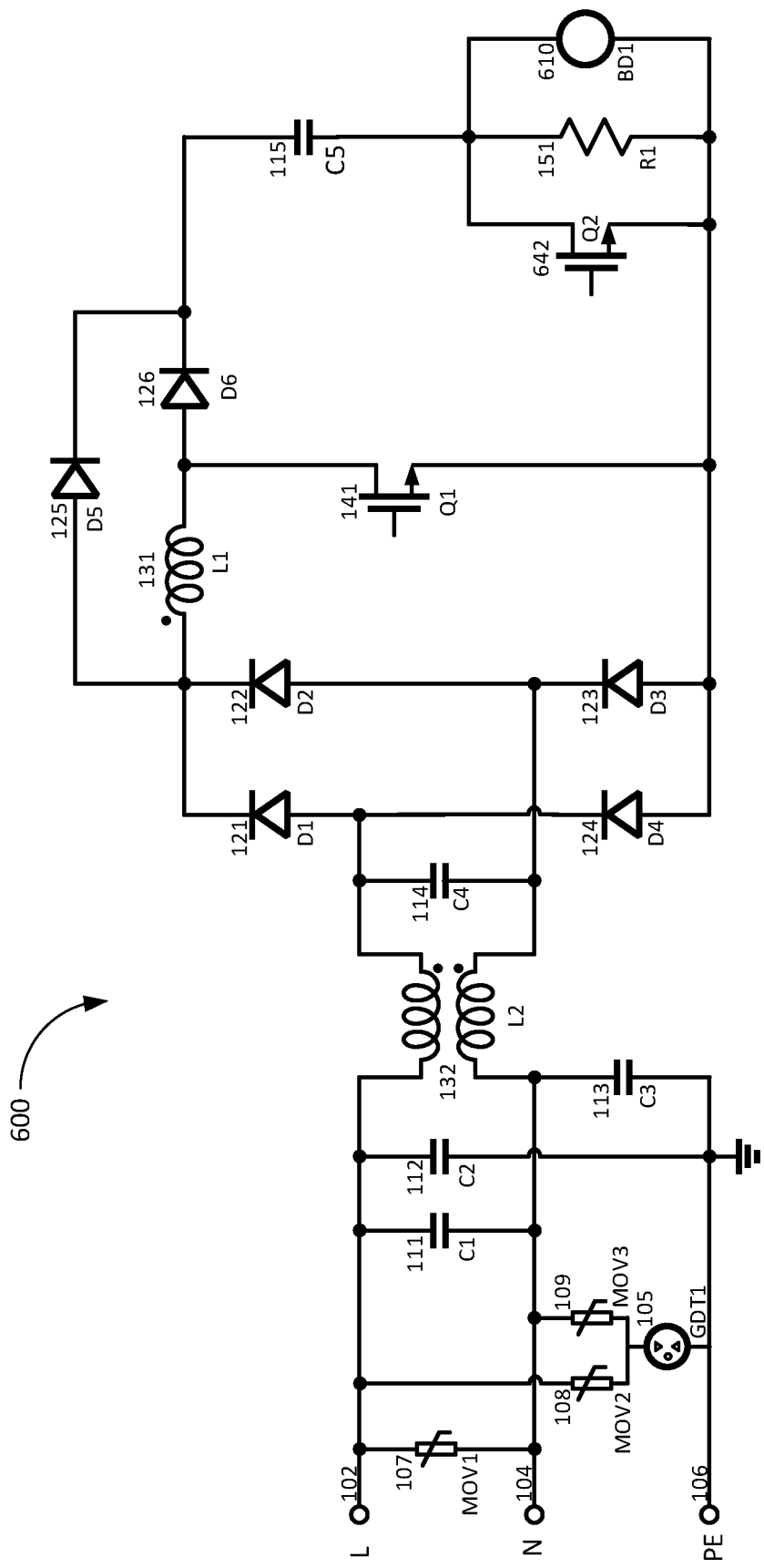
FIG. 6 illustrates an exemplary power converter circuit with bridge rectification and active power factor correction including inrush current limiting and surge protection.

FIG. 6 illustrates an exemplary power converter circuit 600 with bridge rectification and active power factor correction including inrush current limiting and surge protection. This example power converter circuit 600 is similar to power converter circuit 200 from FIG. 2, however this example circuit includes MOSFET Q2 642 as an inrush current control device in place of relay K1 161.

MOSFET Q2 642 is placed in parallel with bulk resistor R1 151 and bypass device BD1 610, and operates similarly to relay K1 161 of FIG. 2.

Figure 7:
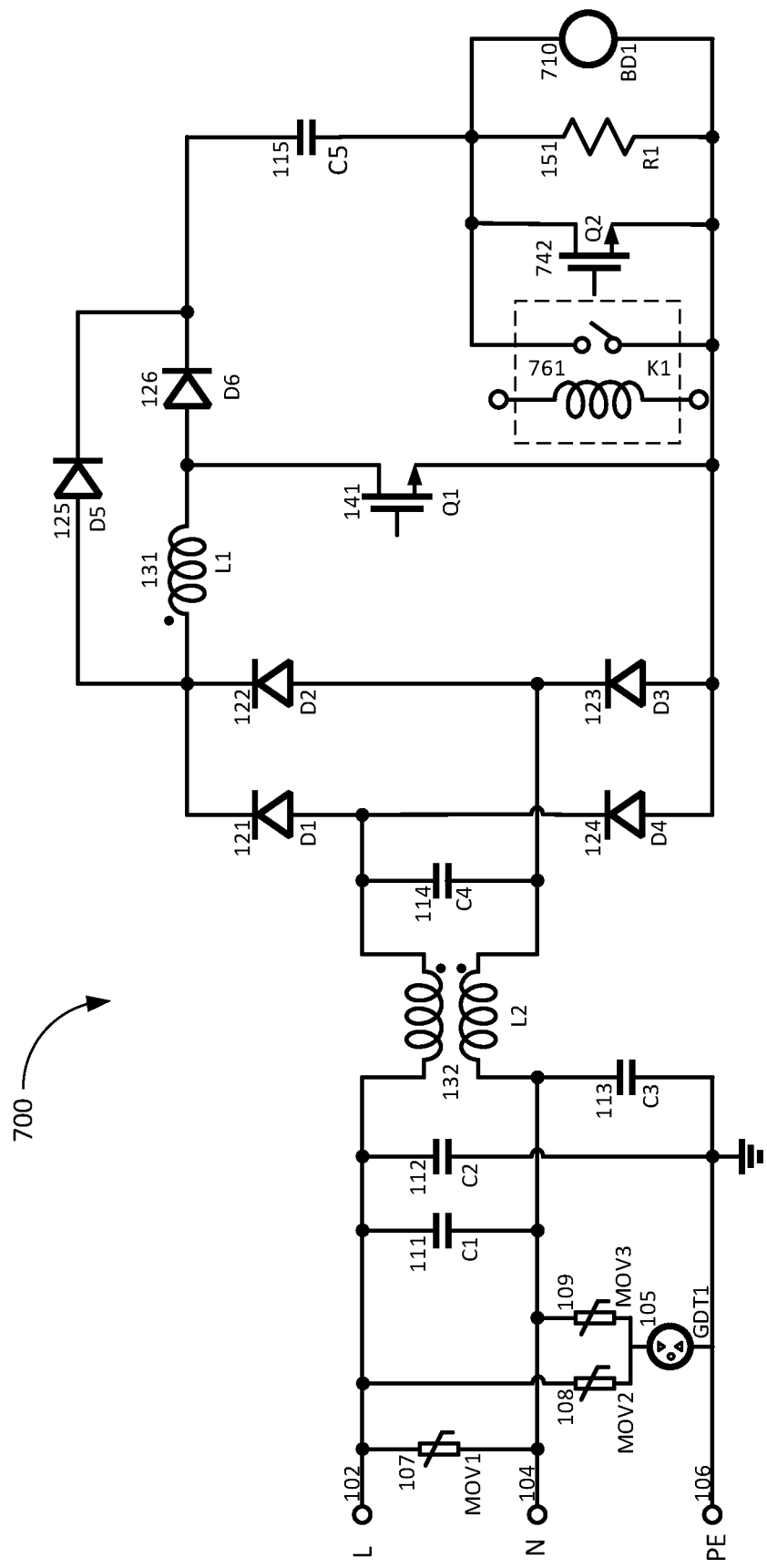
FIG. 7 illustrates an exemplary power converter circuit with bridge rectification and active power factor correction including inrush current limiting and surge protection.

FIG. 7 illustrates an exemplary power converter circuit 700 with bridge rectification and active power factor correction including inrush current limiting and surge protection. This example power converter circuit 700 is similar to power converter circuit 200 from FIG. 2, however this example circuit includes MOSFET Q2 742 as an inrush current control device in parallel with relay K1 761.

MOSFET Q2 742 is placed in parallel with bulk resistor R1 151, bypass device BD1 710, and relay K1 761. Here both MOSFET Q2 742 and relay K1 761 operate together in parallel as an inrush current control device.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above may be combined in various ways to form multiple embodiments. As a result, the invention is not limited to the specific embodiments described above, but only by the claims and their equivalents.

What is claimed is:

1. A power device comprising:
   a bulk capacitor;
   a current limiting resistor in series with the bulk capacitor;
   an inrush current control device in parallel with the current limiting resistor, configured to bypass the current limiting resistor when activated; and
   a bypass device in parallel with the current limiting resistor, configured to provide a low- resistance path to the bulk capacitor during a power surge;
   wherein the bypass device is selected from the group of: gas discharge tubes, spark gaps, transient voltage suppressors, and metal oxide varistors or voltage dependent resistors.

2. The power of claim 1, wherein the bypass device is a gas discharge tube.

3. The power of claim 2, wherein the gas discharge tube has a direct current breakdown voltage greater than a maximum rectified input voltage of the power device and less than a rated voltage of a power switching transistor within the power device.

4. The power of claim 1, wherein the bypass device is a spark gap.

5. The power of claim 1, wherein the bypass device is a transient voltage suppressor.

6. The power device of claim 1, wherein the bypass device is a metal oxide varistor or voltage dependent resistor.

7. The power device of claim 1, wherein the bypass device comprises two or more devices selected from the group of: gas discharge tubes, spark gaps, transient voltage suppressors, and metal oxide varistors or voltage dependent resistors.

8. The power device of claim 1, wherein the inrush current control device comprises a device selected from the group of: relays, metal-oxide-semiconductor field-effect transistors, and insulated-gate bipolar transistors.

9. The power device of claim 1, further comprising:
   an input metal oxide varistor electrically coupled between two input ports;
   an electromagnetic interference filter electrically coupled with the input ports; and
   a power factor correction circuit electrically coupled with the electromagnetic interference filter.

10. The power device of claim 9, wherein the bypass device is configured to protect a power switching transistor within the power factor correction circuit.

11. The power device of claim 9, wherein the current limiting resistor, inrush current control device, and bypass device are electrically coupled with the input ports between the input metal oxide varistor and the electromagnetic interference filter.

12. The power device of claim 9, wherein the power factor correction circuit comprises a bridgeless power factor correction converter.

13. The power device of claim 9, wherein the power factor correction circuit includes a bridge rectifier.

14. An inrush current limiting and surge protection circuit comprising:
   a bulk capacitor;
   a current limiting resistor in series with the bulk capacitor and configured to:
      receive a current from a bridge rectification device; and
      supply the current to the bulk capacitor;
   an inrush current control device in parallel with the current limiting resistor, configured to bypass the current limiting resistor and provide the current to the bulk capacitor when activated; and
   a bypass device in parallel with the current limiting resistor, configured to provide a low-resistance path to provide power surge energy from the bridge rectification device to the bulk capacitor during a power surge.

15. The inrush current limiting and surge protection circuit of claim 14, wherein the bypass device is a gas discharge tube.

16. The inrush current limiting and surge protection circuit of claim 15, wherein the gas discharge tube has a direct current breakdown voltage greater than a maximum rectified input voltage of the power conversion device and less than a rated voltage of a power switching transistor within the power conversion device.

17. The inrush current limiting and surge protection circuit of claim 14, wherein the bypass device is a spark gap.

18. The inrush current limiting and surge protection circuit of claim 14, wherein the bypass device is a transient voltage suppressor.

19. The inrush current limiting and surge protection circuit of claim 14, wherein the bypass device is a metal oxide varistor or voltage dependent resistor.

20. The inrush current limiting and surge protection circuit of claim 14, wherein the bypass device comprises two or more devices selected from the group of: gas discharge tubes, spark gaps, transient voltage suppressors, and metal oxide varistors or voltage dependent resistors.

* * * * *